AMPLIFIER CIRCUIT FOR COLOR TELEVISION

Filed July 11, 1947

INVENTOR.
George C. Sziklai
BY Samuel B. Smith
ATTORNEY

Patented Jan. 20, 1953 2,626,323

UNITED STATES PATENT OFFICE 2,626,323

AMPLIFIER CIRCUIT FOR COLOR TELEVISION

George C. Sziklai, Princeton, N. J., assignor to Radio Corporation of America, a corporation of Delaware Application July 11, 1947, Serial No. 760,400

5 Claims. (Cl. 179—171)

Figures 1, 2:
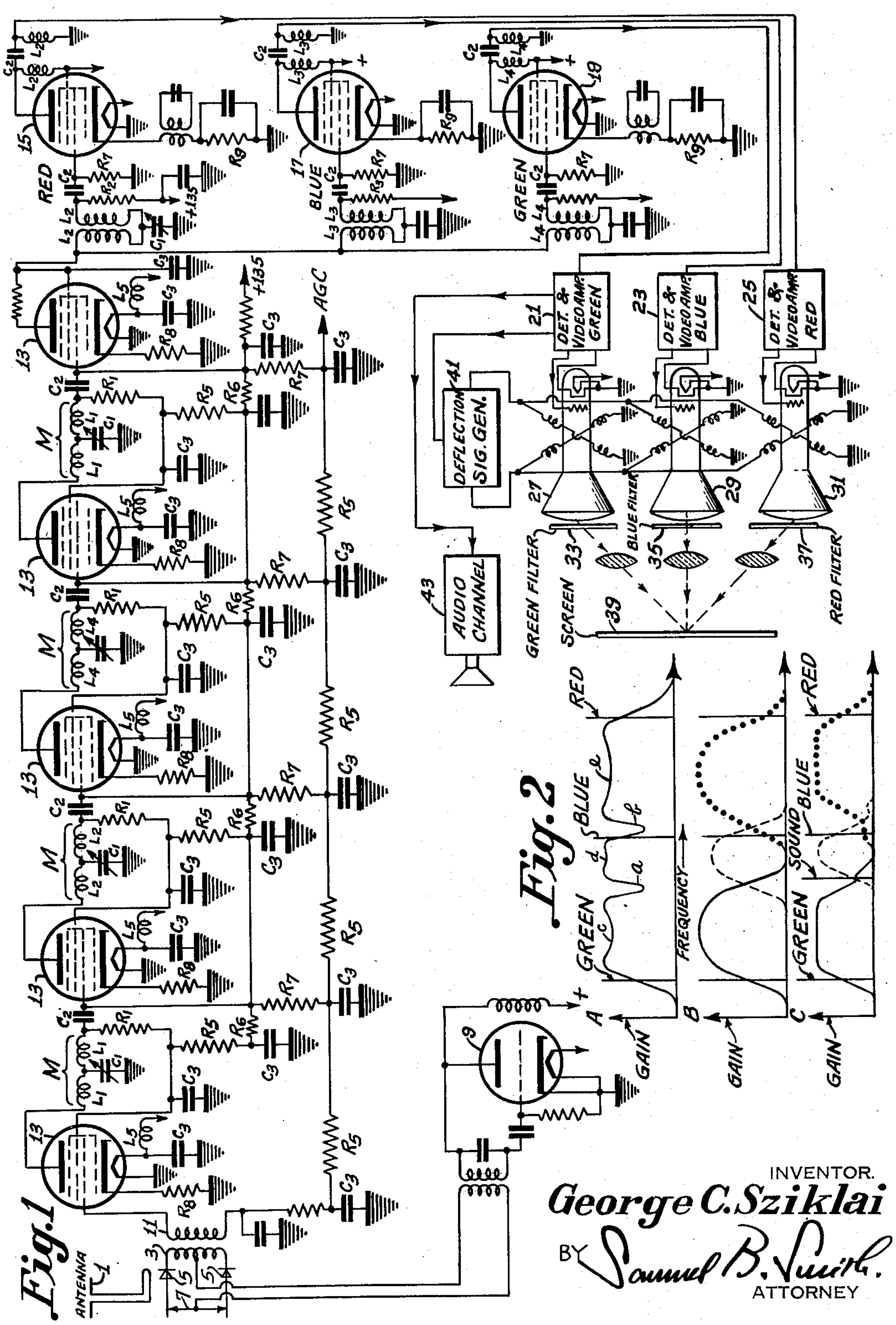

This invention relates to signal amplifiers for the amplification and separation of adjacent frequency bands, and more particularly to simultaneous type color television receiver intermediate frequency amplifiers.

Recent developments in the electronic art have caused an increased demand for signal amplifiers with greater frequency band width handling ability. It is therefore necessary to employ vacuum tubes and associated circuits in such a manner as to realize their greatest efficiency.

It has been generally accepted that the maximum uniform amplification that can be secured in one tube may be expressed by the equation $$A=\frac{g_m}{\pi f_w\sqrt{C_g C_p}}$$

wherein A is the voltage ratio between input and output circuits of equal impedance, $g_m$ is the transconductance of the tube,
$C_g$ and $C_p$ are the grid and plate capacitance of the tube, and
$f_w$ is the width of the frequency band.

We may gather from the above equation that, with any given tube and circuit arrangements, the gain is inversely proportional to the width of the frequency band.

With the advent of color television, there has arisen an important increased requirement for adjacent channel component color signal separation in connection with broad band signal amplification.

In color television systems wherein image reproduction is accomplished by positioning in registry a group of color component images representative of selected component colors which together add to produce a resultant image in substantially its natural color, the image is broken down not only into its elemental areas, but into independent signal trains representative of each of the selected component colors of the image. It will be seen, therefore, that not only is there a requirement for broad frequency band signal transmission, but there is also a requirement for signal separation when the signal trains representative of all the component color images are transmitted in adjacent frequency bands.

It has heretofore been proposed to amplify composite signal trains containing component signal trains located in adjacent channels to the required energy level and then separate for independent reproduction, as required in presently known color television systems. Although such a proposal utilizes a minimum of tubes, it is subjected to serious interference resulting from "cross talk" between component signal trains caused by high level amplification of independent signals in any one amplifier tube.

In order to overcome the interference caused by cross talk, it has been proposed to separate the independent signal trains before amplification. Such practice, however, employs a large number of amplifier tubes and associated circuit elements. Furthermore, full advantage of the band width gain product could not be realized because the individual band width would provide a theoretical gain which practically is too large, due to instability caused by feed back of the extremely high intermediate frequencies employed.

According to this invention, a maximum efficiency is obtained by amplifying the signals to a certain predetermined level separating the independent signal trains and then amplifying the remaining required amount. The amplifier frequency characteristics are chosen to provide a maximum efficiency and results suitable for most stringent requirements.

A primary object of this invention is to provide an improved color television system.

Another object of this invention is to provide for efficient amplification of independent signal trains employing a minimum number of circuit components.

Other and incidental objects of the invention will be apparent to those skilled in the art from a reading of the following specification and an inspection of the accompanying drawing in which Figure 1 illustrates schematically this invention in one of its forms; and Figure 2 illustrates graphically the operation of one form of this invention.

Turning now in more detail to Figure 1, there is shown a suitable signal interceptor or antenna 1 coupled to a suitable mixer circuit involving, for example, coil 3 and crystals 5, together with an appropriate tuning bar 7. A suitable heterodyne oscillator 9 is employed in combination with the mixer circuit to provide an intermediate frequency signal in secondary 11, as is known to the art.

A suitable crystal mixer circuit which may be employed for the reception of television signals is shown and described in more detail in an article by M. J. O. Strutt entitled "Noise Reduction in Mixer Stages," published in the "Proceedings of the Institute of Radio Engineers" for December, 1946, beginning on page 949.

Tubes 13, which may take, for example, the form of the tubes well known to the art as the 6AG5, form a portion of the intermediate frequency amplifier and, for example, a 12 megacycle band pass characteristic in any selected range, such as 110 to 150 megacycles.

The tubes 13 are provided with the required circuit arrangements including coupling elements which, according to one form of this invention, have predetermined signal transmission characteristics which may be more readily understood by a brief reference to Figure 2, wherein there is shown in curve A a response characteristic for the portion of the intermediate frequency amplifier involving tubes 13.

It will be noted that the curves shown in Figure 2 illustrate band pass characteristics. It is well known in the electrical art that band pass characteristics may be obtained in coupling circuits when the primary and secondary are tuned to the same frequency. In order to obtain band pass characteristics where primary and secondary are tuned to the same frequency, it is necessary to adjust the coefficient coupling and the circuit Q's properly in order to obtain the desired width and flatness of the response characteristic. Whereas the width and flatness of the top of the response curve are both affected by the coefficient coupling and the circuit Q's, the width of the top is determined primarily by the coefficient of coupling, and the flatness of the top depends mainly on the circuit Q's. Large couplings correspond to wide tops, high Q's give pronounced double peaks, and low Q's cause the top to be rounded off.

Band pass characteristics may also be obtained by the detuning of coupling circuits. When the primary and secondary circuits have the same Q, a slight detuning produces the same effect, as far as the shape of the secondary response curve is concerned, as increasing the coefficient of coupling. The only essential difference between detuning and increasing the coupling is that with detuning, the magnitude of the response is less than if the same shaped curve is obtained by increasing coupling. Band pass action may also be obtained by combining a single and a double peaked resonance curve with a simple resonance curve.

Providing amplifier circuit elements to give desired response characteristics is well known to the art and needs no detailed explanation here. It will be remembered, however, that the requirement for the most efficient employment of this invention is to secure the maximum product of the band width and the amplification ratio of each stage. The product as referred to is a suitable expression because either element can be increased with a decrease of the other element. The product of the band width in the amplification ratio is necessarily limited by the quotient of the transconductance over the shunt capacitance of the circuit arrangement. The capacitance is an important factor because it limits the wide band coupling impedance that can be built up across the input and output circuits of a vacuum tube.

Of the different forms of coupling networks which can be employed to obtain the desired transmission characteristics, one particular form is illustrated in Figure 1 and, for the purposes of illustration only, typical values are outlined below.

$L_1$=.21 microhenry
$L_2$=.18 microhenry
$L_3$=.2 microhenry
$L_4$=.22 microhenry
$L_5$=2.0 microhenry
M=.12 microhenry
$R_1$=3,300 ohms
$R_2$=10,000 ohms
$R_3$=4,700 ohms
$R_4$=4,700 ohms
$R_5$=1,500 ohms
$R_6$=200 ohms
$R_7$=220,000 ohms
$R_8$=39 ohms
$R_9$=150 ohms
$C_1$=1–7.5 micromicrofarads
$C_2$=87 micromicrofarads
$C_3$=1500 micromicrofarads It will be seen that in one form of this invention, the overall response characteristic of the amplifier portion involving tubes 13 contains signal attenuation in the region between the adjacent wave bands as illustrated by "*a*" and "*b*" in curve A of Figure 2.

A close examination of curve A in Figure 2 also shows a greater amplification inside the respective wave bands but adjacent to their extremities in a manner such as to cause a "dip" in the center region of each of the wave bands designated by letters "*c*," "*d*" and "*e*."

Tubes 15, 17 and 19, which may also be of the 6AG5 type, form the second portion of the intermediate frequency amplifier and each contain a coupling circuit responsive to a different adjacent frequency band, and for the purpose of illustration have been marked red, blue and green, several suitable component colors for tricolor operation.

The separate bands to which each of the vacuum tubes 15, 17 and 19 are allocated are illustrated graphically in curve B of Figure 2.

It will be seen by an examination of the curve shown in Figure 2 that, by adding curve A with curve B, there will result curve C, which shows the green, blue and red component signal train channels separated in such a manner that they may be respectively transmitted to a detector and video amplifier 21 designated for the green signal train, detector and video amplifier 23 designated for the blue signal train, and detector and video amplifier 25 designated to carry the red signal train.

The component colors green, blue and red are selected merely by way of example only, and may be any colors which, when combined, will produce a desirable color image.

Three image producing tubes 27, 29 and 31, together with associated selected component color filters 33, 35 and 37, may be made to project their respective component images in registry on the screen 39 in a manner well known to the art, such as, for example, that shown and described in an article entitled "Simultaneous All-Electronic Color Television," beginning on page 459 of "RCA Review" for December, 1946.

The deflection signals required for scanning operations may be transmitted, as has also been heretofore proposed, in the green signal channel and utilized to produce the required deflection currents in the deflection signal generator illustrated in block 41. A suitable and typical deflection signal generator capable of producing both vertical and horizontal deflection signals is shown and described in the U. S. patent to W. A. Tolson et al., No. 2,101,520, December 7, 1937.

The associated sound may be provided through audio channel 43 and may obtain its required signal energy over the green channel.

Practically all broadcast and similar receivers are now provided with automatic gain control systems to maintain the carrier voltage at the detectors approximately constant. This is accomplished by biasing the grids of the radio-frequency, intermediate-frequency, and converter tubes negatively with a D.-C. voltage derived by rectifying the carrier. An increase in the signal increases the negative bias and tends to counteract the increased signal by reducing the amplification, and vice versa. In the reproduction of images by television, an automatic gain control is also essential and is usually derived in the same manner. Although in television we are not concerned with the average carrier, we are concerned with the departure of the signal from some predetermined level. In this sense, the term automatic gain control rather than automatic volume control is appropriate.

Automatic gain control for the circuit illustrated in Figure 1 may be obtained from any of the detectors, such as, for example, the detector in the audio channel 43. There results a D.-C. voltage proportional to the amplitude of the intermediate frequency carrier at the diode input terminals whose magnitude is controlled by the amplitude of the average carrier signal.

Having thus described the invention, what is claimed is:

1. An intermediate frequency amplifier for a color television receiving system of the type employing a composite signal train having a plurality of designated adjacent frequency bands and wherein each of the designated adjacent frequency bands include signals representative of one different selected component color image, said intermediate frequency amplifier comprising in combination a signal amplifier for said composite signal train said amplifier having greater signal gain in the frequency spectrum adjacent the extremities of said designated adjacent frequency bands than the signal gain in the middle of each of said designated adjacent frequency bands, an output circuit for said amplifier and a plurality of additional signal amplifiers each having an input circuit connected to said output circuit and each of said additional amplifiers responsive only to one different of said frequency bands.

2. An intermediate frequency amplifier for a color television receiving system of the type employing a composite signal train having a plurality of designated adjacent frequency bands and wherein each of the designated adjacent frequency bands include signals representative of one different selected component color image, said intermediate frequency amplifier comprising in combination a signal amplifier for said composite signal train said amplifier having greater signal gain in the frequency spectrum adjacent the extremities of said designated adjacent frequency bands than the signal gain in the middle of each of said designated adjacent frequency bands, an output circuit for said amplifier and a plurality of additional signal amplifiers each having an input circuit connected to said output circuit and each of said additional amplifiers responsive only to one different of said frequency bands, and wherein each of said additional signal amplifiers has a greater signal gain over the frequency spectrum intermediate the extremities of said designated adjacent frequency bands than the signal gain near the extremities of each of said designated adjacent frequency bands.

3. An intermediate frequency amplifier for a color television superheterodyne receiving system of the type employing a composite signal train having a plurality of designated adjacent frequency bands and wherein each of the designated adjacent frequency bands include signals representative of one different selected component color image, said intermediate frequency amplifier comprising in combination a signal amplifier for said composite signal train, said amplifier having greater signal gain over the frequency spectrum intermediate the extremities of said designated adjacent frequency bands than the signal gain at the extremities of each of said designated adjacent frequency bands, an output circuit for said amplifier and a plurality of additional signal amplifiers each having an input circuit connected to said output circuit and each of said additional amplifiers responsive only to one different of said frequency bands, and wherein each of said additional signal amplifiers has a greater signal gain in the frequency spectrum adjacent the extremities of said designated adjacent frequency bands than the signal gain in the middle of each of said designated adjacent frequency bands.

4. An intermediate frequency amplifier for a composite color television signal of the type including a plurality of adjacent component color representative signal bands, said intermediate frequency amplifier comprising in combination, a composite signal amplifier having an output circuit, a component color signal amplifier for each different component color, each of said component color signal amplifiers having an input circuit connected to said composite signal amplifier output circuit, said composite signal amplifier and each of said component color signal amplifiers having substantially complementary non-uniform amplitude characteristics throughout the central portion of each of said signal bands.

5. An intermediate frequency amplifier for a composite color television signal of the type including a plurality of adjacent component color representative signal bands, said intermediate frequency amplifier comprising in combination, a composite signal amplifier having an output circuit, a component color signal amplifier for each different component color, each of said component color signal amplifiers having an input circuit connected to said composite signal amplifier output circuit, said composite signal amplifier having a curved frequency response over the range of each of said signal bands, said component color signal amplifiers having response characteristics substantially complementary over the greater central portion of their pass-band to the frequency response characteristic of the corresponding frequency portion of said composite signal amplifier.

GEORGE C. SZIKLAI.

REFERENCES CITED

The following references are of record in the file of this patent:

UNITED STATES PATENTS

| Number | Name | Date |
|---|---|---|
| 2,164,745 | Kentner | July 4, 1939 |
| 2,236,501 | Goldsmith | Apr. 1, 1941 |
| 2,246,935 | Feldtkeller | June 24, 1941 |
| 2,270,539 | Malling | Jan. 20, 1942 |
| 2,278,801 | Rust | Apr. 7, 1942 |
| 2,321,291 | Grundmann | June 8, 1943 |
| 2,335,180 | Goldsmith | Nov. 23, 1943 |
| 2,406,760 | Goldmark | Sept. 3, 1946 |